UNITED STATES PATENT OFFICE 2,333,851

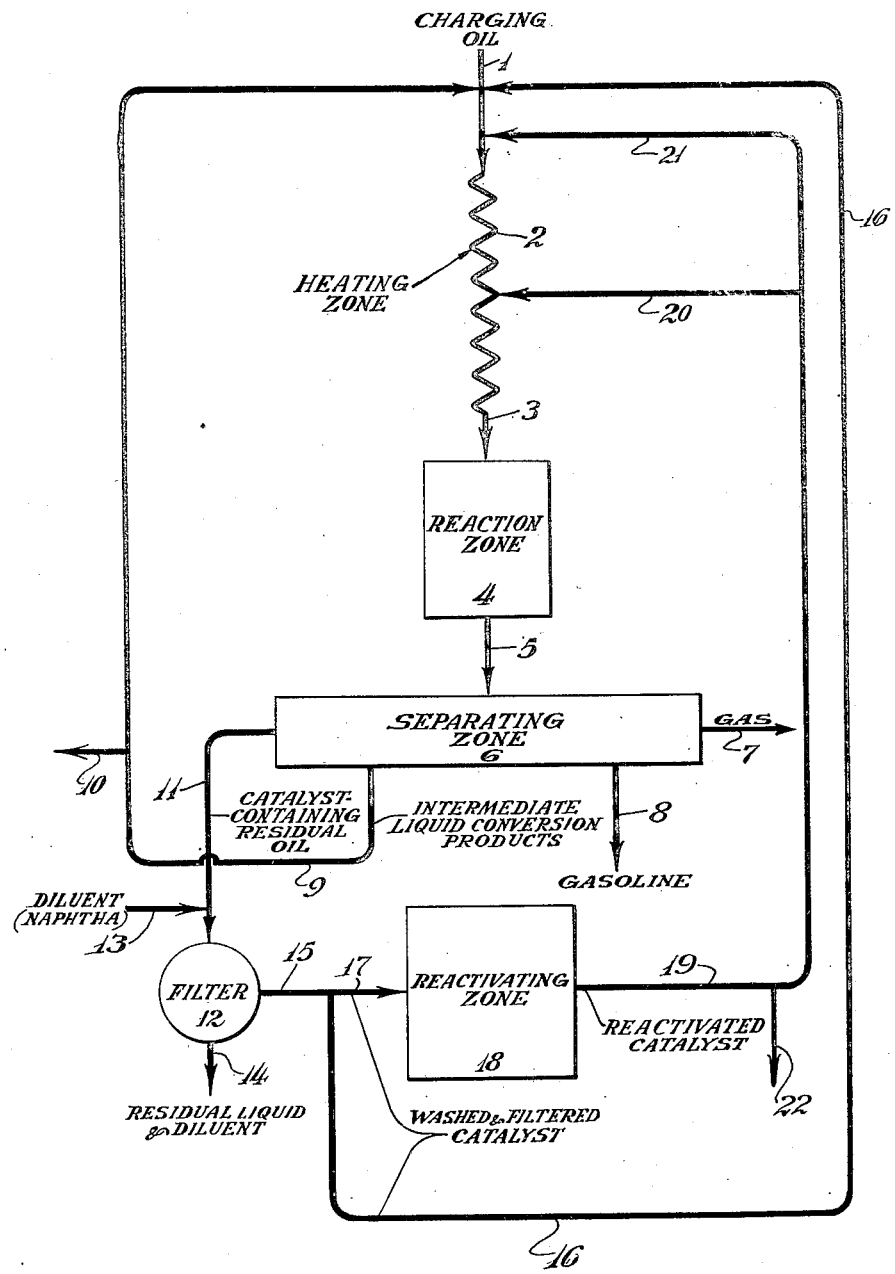

CATALYTIC CONVERSION OF HYDROCARBON OILS

Gustav Egloff, Chicago, Ill., assignor to Universal Oil Products Company, Chicago, Ill., a corporation of Delaware Application June 10, 1940, Serial No. 339,677

7 Claims. (Cl. 196—52)

The invention is particularly concerned with an improved process for the production of good antiknock gasoline from hydrocarbon oils of higher boiling characteristics by catalytic cracking.

The process is of the general type in which a catalytically active solid material, capable of promoting the cracking reaction and in finely divided or powdered form, is passed as a dispersion in the stream of oil undergoing cracking through a heating and cracking zone wherein the desired cracking reaction takes place, the resulting products passing to subsequent separating equipment wherein they are separated into a stream of relatively clean vapors and a stream of catalyst-containing residual oil. The vapors are fractionated to recover the desired gasoline product therefrom and to condense higher boiling components thereof as reflux condensate which may, when desired, be returned to the heating and conversion zone for further cracking treatment.

In conjunction with a process of the general nature above outlined, the invention provides for commingling a suitable light oil, such as naphtha, for example, which acts as a diluent, with the catalyst-containing residual oil removed from the separating step, filtering the mixture to separate the catalyst from the diluted residual oil and contaminating materials washed from the catalyst particles by the diluent, returning a regulated portion of the washed and filtered catalyst particles to the heating and cracking zone, more completely restoring the activity of the remaining portion of the washed and filtered catalyst particles in any well known manner, such as, for example, by burning deleterious combustible deposits therefrom in a stream of oxygen-containing gases, and returning the thus reactivated catalyst to the catalytic cracking zone.

Preferably, the washed and filtered catalyst recycled to the conversion zone without first subjecting it to more complete reactivation is supplied with the oil to be cracked to the inlet of the heating step and may replace or augment the introduction of fresh catalyst into the system. The more completely reactivated catalyst is preferably supplied in regulated amounts to an intermediate point in the heating step wherein it commingles with the stream of oil and fresh and/or washed and filtered catalyst particles undergoing treatment and, by increasing the quantity of catalyst present in the remaining portion of the conversion zone, serves the purpose of either increasing the rate of conversion therein or decreasing the required size of the conversion zone or both.

It has been found that by dilution of the catalyst-containing residual oil with a suitable light oil, such as naphtha, followed by separation of the residual oil and diluent from the catalyst particles by filtration, substantial quantities of the heavy hydrocarbonaceous contaminants deposited on the catalyst particles are thereby removed and a substantial degree of their initial catalytic activity thereby restored. By recycling regulated quantities of the thus partially reactivated catalytic material advantage is taken of its partially restored activity in promoting the cracking reaction and, in conjunction with more complete or extensive reactivation of the remaining portion of the washed and filtered catalyst, followed by its return to the conversion zone, a substantially self-containing process is achieved and the quantity of fresh catalyst supplied to the system may be materially reduced or eliminated.

The accompanying drawing is essentially a flow diagram illustrating the improved process provided by the invention.

Referring to the drawing, the fresh charging oil supplied to the system, which may be any oil amenable to catalytic cracking and which, during at least the initial stage of the operation, contains active catalyst powder which is added thereto in any well known manner, not illustrated, and dispersed through the oil, is supplied through line 1 to a suitable heating zone 2 which is ordinarily an elongated tubular heating coil disposed within a suitable furnace setting, not illustrated.

In passing through the heating coil, the oil and the catalyst particles which it contains are heated to the temperature at which the cracking reaction is to be conducted and, when desired, a substantial portion of the cracking reaction may take place within the heating zone.

Ordinarily, the heating zone is followed by an enlarged insulated or externally heated reaction zone, indicated in the drawing at 4, and to which the heated products from zone 2 are supplied through line 3. Zone 4 may conveniently be a vertically disposed enlarged reaction chamber through which the products from the heating zone are passed and therein afforded additional conversion time or, when desired, an insulated or mildly heated soaking coil or the like may be substituted for the reaction chamber.

The products from reaction zone 4 are directed through line 5 to separating zone 6 wherein their separation into the desired fractions is effected. Ordinarily, the stream of hot conversion products and catalyst from zone 4 is cooled, within or prior to its introduction into the separating zone, to a temperature at which deleterious further conversion thereof is prevented, this being accomplished in any conventional manner, not illustrated. The separating zone may conventionally comprise a chamber wherein vaporous conversion products are separated from the residual oil in which the catalyst particles remain suspended or dispersed, followed by conventional fractionating, condensing and collecting equipment.

In the particular case here illustrated, the conversion products supplied to zone 6 are therein separated into normally gaseous fractions, gasoline, intermediate liquid conversion products (reflux condensate formed by fractionation of the vapors) and catalyst-containing residual oil. The uncondensed gaseous fractions are removed from the separating zone through line 7 to storage or elsewhere, as desired. The gasoline product of the process, which will in its final form ordinarily contain dissolved high-boiling gases in quantities regulated to impart the desired vapor pressure thereto, is removed from the separating zone through line 8 to storage or to any desired further treatment. Intermediate liquid conversion products are withdrawn from the separating zone through line 9 and may be recycled, all or in part, to the heating zone for further catalytic cracking treatment, or a portion or all of the intermediate liquid conversion products may, when desired, be directed from line 9 through line 10 to storage or to separate catalytic or thermal cracking treatment or elsewhere, as desired. It is entirely within the scope of the invention, although only one line is shown in the drawing for the removal of intermediate liquid conversion products from the separating zone, to separate these products by fractionation into a plurality of selected fractions of different boiling range characteristics for separate further treatment or recovery, as desired.

The catalyst-containing residual oil is removed from the separating zone through line 11 and directed therethrough to filter 12 which is preferably a rotary or other continuous type of filter capable of separating the catalyst particles from substantially all of the residual oil. To dilute the residual oil and assist in removing from the catalyst particles, which it contains, substantial quantities of heavy contaminating hydrocarbonaceous conversion products absorbed by or deposited on the catalyst particles during operation, a relatively light hydrocarbon oil, such as naphtha or the like, which may be derived from within the system or from an external source, is commingled with the stream of catalyst-containing residue supplied to filter 12. Line 13 is provided, in the case here illustrated, for introduction of the diluent and washing oil. The residual liquid and diluent filtered from the catalyst particles and containing contaminants removed from the latter is directed from the filter through line 14 to storage or to redistillation for recovery of the diluent or elsewhere, as desired. The washed and filtered catalyst is preferably removed from the filter in relatively dry state through line 15 and regulated quantities of this material are returned through line 16 to heating zone 2, preferably being supplied to the inlet of this zone, as shown.

That quantity of the washed and filtered catalyst not recycled through the system, in the manner described, is directed through line 17 to reactivating zone 18 wherein the activity of the catalyst is more completely restored in any desired conventional manner, such as, for example, by burning remaining carbonaceous or hydrocarbonaceous deposits therefrom in a stream of hot oxygen-containing gases. Continuous reactivation of the catalyst may be accomplished in a conveyer of the belt or helical type or in a rotary retort, for example, or the reactivating zone may comprise alternately operated chambers in one or more of which reactivation of the catalyst is accomplished while previously reactivated catalyst is being removed from another or other such chambers. The reactivated catalyst particles are returned from the reactivating zone through line 19 to heating zone 2, preferably being supplied, at least in part, to an intermediate point therein through branch line 20. It may, however, be supplied, all or in part, to the inlet of zone 2 through branch line 21. Recycling of the reactivated catalyst in this manner will, in most instances, obviate the continued introduction of fresh catalyst particles into the system but, when desired, regulated quantities of the latter may also be continuously supplied thereto, in which case a portion of the reactivated catalyst may be continuously removed from the system, to storage or elsewhere, as desired, through line 22 communicating with line 19.

In order to facilitate recirculation of the washed and filtered catalyst particles to the heating zone, they may, when desired, be supplied to a suitable mixing zone of any conventional form, not illustrated, or otherwise mixed with and dispersed in a portion or all of the oil to be catalytically cracked. The same applies to the reactivated catalyst particles recycled from the reactivating zone to the heating step. The formation of a slurry or dispersion of the catalyst particles in oil permits them to be returned to the conversion zone by a pump of conventional form and introduction of the washed and filtered catalyst particles into the mixing zone and into the reactivating zone may conveniently be accomplished by gravity feed or by the use of a centrifugal pump or blower.

The invention is not concerned with the specific type of catalyst employed for promoting the cracking reaction so long as it is in sufficiently finely divided or powdered form to remain suspended or dispersed in the oil undergoing treatment. One such catalyst comprises a substantially impalpable powder consisting essentially of silica and one or more metal oxides of the group consisting of alumina, zirconia, titania and thoria, the powder being obtained by precipitation of one or more of the active ingredients from a solution. No novelty is claimed herein for this particular catalyst nor for its method of preparation and, as previously mentioned, any known cracking catalyst capable of accomplishing the desired results may be employed within the scope of the invention.

The amount of catalyst employed in relation to the quantity of oil treated will depend upon the nature of the oil, the specific composition and activity of the catalyst, the fineness of subdivision of the catalyst particles and the relative amounts of washed and filtered catalyst and more completely reactivated catalyst employed. When cracking relatively light paraffinic oils, such as gas-oil, for example, with a precipitated silica-alumina catalyst powder, from 1 to 10% or more by weight of catalyst, based on the oil subjected to cracking treatment, has been found to give good results.

The maximum temperature employed in the heating zone may range, for example, from 850 to 1050° F., or thereabouts, depending upon the nature of the oil undergoing treatment and the catalyst employed. Temperatures of from 900° F. upward will ordinarily be utilized for relatively light oils and when intermediate liquid conversion products of the process are returned to the heating coil.

The temperature maintained in the reaction zone succeeding the heating coil may be substantially the same or somewhat lower than the maximum temperature in the heating coil.

A superatmospheric pressure of the order of 30 to 100 pounds, or thereabouts, per square inch is preferably employed in the cracking zone and may be substantially equalized or reduced in the succeeding separating equipment.

As an example of one specific operation of the process, the charging stock is an essentially paraffinic gas-oil of approximately 36° A. P. I. gravity which is supplied to the heating coil together with selected high-boiling fractions of the reflux condensate formed by fractionation of the vaporous conversion products. The reflux condensate recycled to the heating coil for further treatment consists predominantly of fractions boiling above approximately 530° F., a major portion of its lighter fractions being employed as a diluent and wash oil for removing deleterious deposits from the used catalyst by commingling the same with the catalyst-containing residual oil prior to filtration thereof. A temperature of approximately 1000° F. is employed at the outlet of the heating step and an average temperature of approximately 810° F. is maintained in the succeeding reaction chamber. The filtering and reactivating steps are operated at substantially atmospheric pressure and a substantially uniform superatmospheric pressure of approximately 50 pounds per square inch is maintained in the rest of the system.

At the beginning of the operation approximately 2% of fresh catalyst powder, by weight of the oil undergoing treatment, is supplied to the system with the charging oil and as the operation progresses this is replaced, in part, by reactivated catalyst which is supplied as a dispersion in a portion of the intermediate liquid conversion products to an intermediate point in the conversion zone. Washed and filtered catalyst particles are supplied as a dispersion in the charging oil to the inlet of the heating step and further replaces the fresh catalyst initially supplied thereto. The ratio of washed and filtered catalyst particles to reactivated catalyst is approximately 2 to 1 and the total weight of catalyst employed after discontinuing the introduction of fresh catalyst is approximately 4% of the combined feed (charging oil plus the heavy reflux condensate).

In an operation such as above described, I may obtain per barrel of gas-oil charging stock supplied to the system approximately 53% of 400° F. end-point gasoline having an octane number of approximately 74 as determined by the motor method or approximately 85 as determined by the research method. The additional products of the process consist essentially of normally gaseous fractions which contain a high percentage of readily polymerizable olefins, residual liquid and relatively light intermediate liquid conversion products. A quantity of the latter, boiling between approximately 400 and 530° F. and corresponding to approximately 100% by volume of the catalyst-containing residual oil, is commingled therewith as a diluent and washing oil prior to filtration and the light fractions are subsequently separated by distillation from the residual oil and heavy contaminants removed from the catalyst particles.

I claim:

1. In a catalytic cracking operation wherein hydrocarbon oil to be cracked is passed, together with finely divided solid catalytic material capable of promoting the cracking reaction and dispersed within the stream of oil undergoing treatment, through a conversion zone wherein the desired cracking reaction takes place, the resulting products separated into a catalyst-containing residual oil and vaporous conversion products and said vapors fractionated to recover the desired light distillate product therefrom and to condense higher boiling fractions thereof as reflux condensate, the improvement which comprises commingling with the catalyst-containing residual oil a lower boiling hydrocarbon oil diluent to remove contaminating hydrocarbonaceous conversion products from the catalyst particles, filtering residual oil, diluent and removed contaminants from the resulting partially reactivated catalyst, returning regulated quantities of the latter to the catalytic conversion zone, more completely reactivating the remainder of the washed and filtered catalyst and supplying resulting more completely reactivated catalyst to the conversion zone at an intermediate point therein.

2. The process defined in claim 1, wherein reflux condensate resulting from said fractionation of the vaporous conversion products is returned to the catalytic cracking step for further treatment.

3. The process defined in claim 1, wherein that portion of the washed and filtered catalyst returned to the catalytic conversion zone, without first subjecting the same to more complete reactivation, is commingled with the oil to be cracked and supplied therewith to said conversion zone.

4. The process defined in claim 1, wherein a portion of said more completely reactivated catalyst is commingled with the oil to be cracked and supplied therewith to said conversion zone.

5. The process defined in claim 1, wherein during the initial stage of the operation fresh catalyst is supplied to the system with the oil to be cracked and as the operation progresses is replaced, at least in part, by the recycled partially and more completely reactivated catalyst.

6. The process of catalytically cracking hydrocarbon oil which comprises passing said oil together with regulated quantities of finely divided solid particles capable of promoting the desired cracking reaction and dispersed in the stream of oil undergoing treatment, through an elongated heating coil, therein heating the same to an active catalytic cracking temperature and initiating the cracking reaction, supplying resulting heated products to a subsequent reaction zone wherein the desired cracking reaction is completed, separating from the resulting products a catalyst-containing residual oil and a stream of relatively clean vapors, fractionating the latter to form reflux condensate and to separately recover therefrom gasoline of the desired end-boiling point, commingling with said catalyst-containing residual oil a lower boiling hydrocarbon oil diluent to remove contaminating hydrocarbonaceous conversion products from the catalyst particles, filtering the resulting mixture to separate substantially dry catalyst particles from said residual oil, diluent and contaminants removed from the catalyst, returning a portion of the thus partially reactivated catalyst to the inlet of the heating coil, more completely reactivating another portion thereof by burning deleterious combustibles therefrom in a stream of oxygen-containing gases and introducing regulated amounts of the more completely reactivated catalyst into an intermediate point in the heating coil.

7. A conversion process which comprises passing a mixture of hydrocarbon oil and finely divided cracking catalyst through a conversion zone and subjecting the same therein to catalytic cracking conditions, separating the reaction mixture into vapors and a catalyst-containing residual oil, fractionating and condensing the vapors, commingling a relatively light hydrocarbon oil with catalyst-containing residual oil separated as aforesaid and filtering the resultant mixture, thereby partially reactivating the catalyst, returning thus partially reactivated catalyst to the inlet of the conversion zone, to pass through the entire length thereof, more completely reactivating another portion of the catalyst by burning carbonaceous matter therefrom, and introducing at least a portion of the more completely reactivated catalyst to said zone at an intermediate point in the length thereof.

GUSTAV EGLOFF.